2,914,435
BRAZING ALLOY-FLUX PASTE

Rene D. Wasserman, New York, and Henry H. Simons, Bayside, N.Y., assignors to Eutectic Welding Alloys Corporation, New York, N.Y., a corporation of New York No Drawing. Application October 2, 1956
Serial No. 613,365

5 Claims. (Cl. 148—24)

The present invention relates to a brazing alloy and flux composition, more particularly to a stable paste containing a brazing alloy powder and compatible fluxing ingredients.

It has repeatedly been suggested to combine fluxes with powdered filler metals in the form of a paste which may be conveniently applied to the surfaces of base metals that are to be joined by welding, brazing or soldering. A serious drawback of such compositions is that they are unstable. The powdered metal tends to settle on storage, and the flux ingredients usually corrode the metal particles. For these reasons such compositions have not proved successful in the past.

It is the primary object of our invention to provide a stable brazing alloy-flux paste that can be stored for extended periods without substantial settling or corrosion of the metal particles. Another object is to provide such a paste that will flow readily through capillary action when heated above the fusion point of the alloy, and thus spread into tight joints and small crevices. These objects and others have been accomplished by the compositions hereinafter described and illustrated by the specific examples given.

We have found that a combination of various factors is essential to produce the desired results. The composition of the brazing alloy is one of the least critical elements. A large variety of such thin flowing alloys with melting points ranging from about 1100 to about 1500° F. have been found suitable. One suitable illustrative class of such brazing alloys includes silver and copper with various additional metals such as zinc, cadmium, tin, nickel, and manganese. Typical compositions may be selected from the following ranges:

| | Percent by weight |
|---|---|
| Silver | 10 to 70 |
| Copper | 14 to 50 |
| Zinc | 0 to 35 |
| Cadmium | 0 to 35 |
| Tin | 0 to 10 |
| Nickel, manganese | 0 to 15 |

Another type of suitable brazing alloy is one using a copper-phosphorus composition. A typical composition may be selected from the following ranges:

| | Percent by weight |
|---|---|
| Copper | 93.6 to 94.0 |
| Phosphorus | 6.5 to 7.0 |

A further form of applicable brazing alloy is a copper-phosphorus-silver alloy. Typical copper-phosphorus-silver compositions may be selected from the following ranges:

| | Percent by weight |
|---|---|
| Copper | 87.0 to 89.0 |
| Phosphorus | 5.75 to 6.5 |
| Silver | 5.5 to 6.5 |

The mesh size of the metal particles has been found to be of great importance to obtain a non-settling paste with the particular fluxing ingredients, proportions of metal to flux and paste vehicle employed. In our compositions we have found that best results are obtained when the brazing alloy powder has a particle size between 100 and 150 mesh. For a particle size of 100 mesh, 100% of the particles must pass through a 100 mesh screen and at least 80% of the particles must remain on a 150 mesh screen. For a particle size of 150 mesh, 100% of the particles must pass through a 150 mesh screen and at least 80% must remain on a 200 mesh screen. The optimum mesh size will vary somewhat depending on the proportions of the other ingredients, particularly flux and vehicle.

A most important factor is the composition of the fluxing ingredients, which must be compatible with the alloy powder. Fluxing ingredients used with the high silver content powders, for example, contain a desirable proportion of borates and fluorides, but are free from boric acid which would corrode the silver brazing alloy.

Fluxing ingredients for the copper-phosphorus alloys, however, do contain boric acid in order to bring about the right balance of acidity or alkalinity, melting point and activity.

A further requirement of all types of fluxing ingredients is that they should melt at a temperature slightly below the melting point of the alloy powder used. Control of the flux melting point is accomplished by proper selection and proportioning of the flux constituents.

Our preferred fluxing ingredient composition for high silver alloy powders includes alkali metal polyborates, particularly potassium pentaborate and potassium tetraborate, and alkali metal fluorides, particularly potassium bifluoride and alkali metal fluoborates. The preferred ratio of borates to fluorides lies between 0.6 and 1.6 parts by weight of the former for each part by weight of the latter. When employing both potassium pentaborate and potassium tetraborate, their preferred ratios are from 1.0 to 2.5 parts by weight of the former for each part by weight of the latter. Sodium salts can be used in part, but they are definitely inferior to the potassium salts.

We have found that it is highly desirable to include a small proportion of an alkali metal fluoborate, particularly potassium fluoborate, among the fluxing ingredients. The potassium fluoborate may be added in amounts from 2 to 20% by weight of the total flux ingredients. The addition of this ingredient was found to impart greater fluidity and a lower melting point to the flux. It appears to result in a better capillary flow of a high silver content brazing alloy powder by drawing the molten metal into the seam.

One must adjust the fusion point of the flux in accordance with the melting point of the particular silver brazing alloy powder employed. This is readily accomplished by varying the proportions of the fluxing ingredients within the ranges indicated above. Thus, the melting point of the flux may be raised by increasing the amount of borates and, conversely lowered by increasing the amount of fluorides. The fusion point of the flux should, of course, be maintained below the melting point of the alloy. It is possible to adjust the fusion points of our fluxes to range between 900 and 1100° F., which conforms to the silver brazing alloy melting points of from 1100 to 1500° F.

A preferred fluxing ingredient composition for copper-phosphorus alloy powder may be described as a boric acid flux. A preferred range of constituents for a boric acid flux to be used with copper-phosphorus alloy powders is between 50 to 80% by weight of boric acid and between 20 to 50% by weight of potassium bifluoride. The fusing point is adjusted below the melting point of the alloy powder.

The vehicle employed to give the product its desired pastelike consistency is preferably water. If desired, the water may be replaced in part by some suitable water-miscible organic liquid, such as methyl or ethyl alcohol, but this increases the cost without imparting compensating benefits. It the organic liquid predominates, this may lead to a fire hazard.

The proportions of brazing alloy powder, fluxing ingredients and aqueous paste vehicle are critical for obtaining the desired consistency, metal-joining properties, and nonsettling properties. We have found that the desired characteristics are obtained only when formulating compositions within the following ratio ranges:

| | Percent by weight |
|---|---|
| Metal powder | 50 to 70 |
| Flux ingredients | 25 to 45 |
| Aqueous vehicle | 8 to 14 |

At least 50% by weight of the brazing alloy powder is needed in order to furnish enough filler metal to provide the desired joint. Should the fluxing ingredients fall below 25%, they will not suffice to impart the desired flowing characteristics to the molten filler metal. If the aqueous vehicle is below 8%, the paste tends to harden and become unworkable, while a ratio of over 14% makes the composition excessively liquid and subject to rapid settling of the metal particles.

The preparation of our brazing alloy-flux pastes is quite simple. The ingredients are mixed in a predetermined sequence by any convenient means, such as a mechanical stirrer of the Hobart type. The fluxing ingredients are first mixed into the aqueous paste vehicle. Since these fluxing ingredients are partially water-soluble, there results a thin homogeneous paste. If need be, the intermixing of the fluxing ingredients may be assisted by heating the mixture. The metal powder is then gradually added to the thin homogeneous paste while stirring. The final consistency of the paste may be varied, depending upon the desired method of application by a proper selection of metal powder, flux and vehicle ratio within the ranges given above.

Having generally described our new brazing alloy-flux paste, we shall now furnish some specific examples thereof for purposes of illustration. We do not, however, intend to limit the scope of our invention to such details and wish to include all variations apparent from our general disclosure, unless expressly excluded from our claims.

Example I

A flux was prepared by mixing the following ingredients in finely divided form:

| | Percent by weight |
|---|---|
| Potassium pentaborate | 42 |
| Potassium tetraborate | 18 |
| Potassium bifluoride | 30 |
| Potassium fluorborate | 10 |

Twenty-five parts by weight of this flux were gradually added to 10 parts by weight of water, while stirring and gently heating to 150° F. The flux thus becomes a thin homogeneous paste.

Sixty-five parts by weight of a silver brazing alloy powder having an average particle size of 125 mesh were then gradually added to such homogeneous paste. The mixture was stirred, particularly towards the end of the addition of the metal powder. The composition of said silver brazing alloy was as follows:

| | Percent by weight |
|---|---|
| Silver | 45 |
| Copper | 30 |
| Zinc | 25 |

It has a melting point of about 1250° F., whereas the melting point of the flux was about 1100° F.

Upon completion of the addition of the metal powder, stirring was discontinued and the resultant paste in which the metal particles were uniformly distributed displayed a consistency somewhat similar to that of cold cream. When filled into glass jars having a capacity of ½ lb. each and tightly sealed, this paste remained stable under normal conditions of storage for a period of over 90 days. There was no appreciable settling or corrosion of the metal particles. At the end of such period, a jar was opened and the paste therein was applied by means of a brush to a narrow joint between two pieces of copper metal. Upon heating up the joint by means of an oxyacetylene flame to a temperature above the melting point of the alloy, the water first evaporated from the paste, the flux then fused and the alloy particles finally melted and flowed readily into the joint. Upon cooling, a very strong joint with excellent penetration and distribution of the filler metal was obtained.

Example II

A brazing alloy-flux paste of the high silver content type was prepared in the same manner as described in the preceding example. In this case the flux was composed as follows:

| | Percent by weight |
|---|---|
| Potassium pentaborate | 44 |
| Potassium tetraborate | 18 |
| Potassium bifluoride | 38 |

Forty parts by weight of this flux were mixed with 10 parts by weight of water. To the thin homogeneous paste thus obtained there were added 50 parts by weight of a silver brazing alloy powder (passing through a 100 mesh sieve, but retained on a sieve of 150 mesh) having the following composition:

| | Percent by weight |
|---|---|
| Silver | 57.5 |
| Copper | 32.5 |
| Tin | 7.0 |
| Manganese | 3.0 |

The resultant paste was likewise stable to storage and produced excellent joints when applied to stainless steel metal parts and subjected to temperatures of over 1350° F. in an oven.

Example III

Another paste of the high silver content type was prepared as described above from 27 parts by weight of the following flux:

| | Percent by weight |
|---|---|
| Potassium pentaborate | 42 |
| Potassium tetraborate | 18 |
| Potassium bifluoride | 40 |

Eight parts by weight of water, and 65 parts by weight of a silver brazing alloy powder (100–150 mesh) having the following composition:

| | Percent by weight |
|---|---|
| Silver | 45 |
| Copper | 15 |
| Cadmium | 24 |
| Zinc | 16 |

The resultant paste was applied by brushing to the surfaces of steel metal parts, that were to be joined. The parts were then held together with the coated surfaces opposed and placed in an oven heated to a temperature of about 1350° F. for 10 minutes. Upon cooling, it was found that an excellent bond had been achieved.

Example IV

Another very useful silver brazing alloy-flux paste having excellent stability upon prolonged storage was prepared from the following:

Thirty-five parts by weight of a flux composed of—

| | Percent by weight |
|---|---|
| Potassium pentaborate | 38 |
| Potassium tetraborate | 15 |
| Potassium bifluoride | 35 |
| Potassium fluoborate | 12 |

Twelve parts by weight of water and 53 parts by weight of a silver brazing alloy powder (150 mesh) composed of—

| | Percent by weight |
|---|---|
| Silver | 40 |
| Copper | 30 |
| Zinc | 28 |
| Nickel | 2 |

This paste was employed for bonding parts of stainless steel metal. When heated above 1440° F. by means of an oxyacetylene torch, the flux and metal melted, and the molten metal displayed an excellent flow enabling it to penetrate into a narrow seam and produce a very strong joint.

*Example V*

A paste of the copper-phosphorus alloy powder type having excellent stability was prepared as follows:

25 parts by weight of a flux composed of—

| | Percent by weight |
|---|---|
| Boric acid | 70 |
| Potassium bifluoride | 30 |

65 parts by weight of a copper-phosphorus alloy powder (100–150 mesh) composed of—

| | Percent by weight |
|---|---|
| Copper | 93 |
| Phosphorus | 7 | and 10 parts by weight of water.

This paste was employed for bonding parts of copper and a very strong joint with excellent penetration and distribution of filler metal was obtained.

*Example VI*

Another copper-phosphorus paste was prepared as follows:

25 parts by weight of a flux composed of—

| | Percent by weight |
|---|---|
| Boric acid | 70 |
| Potassium bifluoride | 30 |

65 parts by weight of alloy powder (100–150 mesh) composed of—

| | Percent by weight |
|---|---|
| Copper | 88 |
| Phosphorus | 6 |
| Silver | 6 | and 10 parts by weight of water.

This paste was also employed for bonding parts of copper with excellent results.

This application is a continuation-in-part of prior patent application Serial Number 503,346, filed April 22, 1955, now abandoned.

We claim:

1. A stable brazing alloy-flux paste consisting essentially as follows: from about 25 to about 45 parts by weight of fluxing ingredients of the alkali metal borate and alkali metal fluoride type, from about 8 to about 14 parts by weight of an aqueous paste vehicle, from about 50 to about 70 parts by weight of a brazing alloy powder having a particle size from about 100 to 150 mesh, said brazing alloy powder consisting essentially of from 10 to 70% by weight of silver, from 14 to 50% by weight of copper and the remainder being alloying metals which are compatible with said silver and copper to produce a thin flowing alloy having a melting point ranging from about 1100 to 1500° F., said flux ingredients having a fusion point below the melting point of said alloy powder and being compatible with the compositions of said alloy powder to protect it from oxidization during deposition without corroding it, and said aqueous vehicle forming a suspension of said fluxing ingredients and said alloy powder.

2. A brazing alloy-flux paste as claimed in claim 1, wherein the brazing alloy powder has a composition within the following ranges:

| | Percent by weight |
|---|---|
| Silver | 10 to 70 |
| Copper | 14 to 50 |
| Zinc | 0 to 35 |
| Cadmium | 0 to 35 |
| Tin | 0 to 10 |
| Nickel, manganese | 0 to 15 |

3. A brazing alloy-flux paste as set forth in claim 1, wherein said fluoride constituent of said flux is in the bifluoride form.

4. A brazing alloy-flux paste as set forth in claim 1 wherein said fluxing ingredients are of the potassium borate-fluoride type wherein the ratio of borates to fluorides lies between 0.6 and 1.6 parts by weight of the former for each part by weight of the latter.

5. A brazing alloy-flux paste as claimed in claim 4, containing potassium polyborates, potassium bifluoride and from 2 to 20% of potassium fluoborate.

References Cited in the file of this patent

UNITED STATES PATENTS

| 2,200,743 | Hardy | May 14, 1940 |
| 2,267,762 | Streicher | Dec. 30, 1941 |
| 2,267,763 | Streicher | Dec. 30, 1941 |
| 2,452,995 | Cinamon | Nov. 2, 1948 |

FOREIGN PATENTS

| 646,377 | Great Britain | Nov. 22, 1950 |

UNITED STATES PATENT OFFICE
CERTIFICATE OF CORRECTION

Patent No. 2,914,435                                           November 24, 1959

Rene D. Wasserman et al.

It is hereby certified that error appears in the printed specification of the above numbered patent requiring correction and that the said Letters Patent should read as corrected below.

Column 1, line 58, for "93.6" read -- 93.0 --; column 3, line 5, for "It the" read -- If the --; line 35, after "mixture" insert a period --; line 36, after "stirring" insert a period; line 40, after "above" insert a period; line 55, for "fluorborate" read -- fluoborate --; column 4, line 67, for "Anther" read -- Another --.

Signed and sealed this 28th day of June 1960.

(SEAL)
Attest:

KARL H. AXLINE
Attesting Officer

ROBERT C. WATSON
Commissioner of Patents